US010341852B2

(12) United States Patent
Kowalczykowski et al.

(10) Patent No.: US 10,341,852 B2
(45) Date of Patent: Jul. 2, 2019

(54) INFORMATIONAL ARTICLES IN RESPONSE TO DETECTION OF DEVICES OR SOFTWARE

(71) Applicant: Apple Inc., Cupertino, CA (US)

(72) Inventors: Keith P. Kowalczykowski, San Francisco, CA (US); Sam H. Gharabally, San Francisco, CA (US); Pedraum R. Pardehpoosh, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/720,809

(22) Filed: Sep. 29, 2017

(65) Prior Publication Data

US 2018/0352426 A1    Dec. 6, 2018

Related U.S. Application Data

(60) Provisional application No. 62/514,069, filed on Jun. 2, 2017.

(51) Int. Cl.
| | |
|---|---|
| *H04W 4/80* | (2018.01) |
| *H04W 8/26* | (2009.01) |
| *G06F 15/78* | (2006.01) |
| *H04L 29/08* | (2006.01) |
| *H04L 12/28* | (2006.01) |
| *G06F 8/38* | (2018.01) |
| *G06F 9/4401* | (2018.01) |
| *G06F 17/22* | (2006.01) |
| *G06F 8/65* | (2018.01) |

(52) U.S. Cl.
CPC .............. *H04W 8/265* (2013.01); *G06F 8/38* (2013.01); *G06F 9/4411* (2013.01); *G06F 15/7871* (2013.01); *H04L 12/2809* (2013.01); *H04L 67/16* (2013.01); *G06F 8/65* (2013.01); *G06F 17/2288* (2013.01)

(58) Field of Classification Search
CPC ..... H04W 76/064; H04W 4/046; H04W 4/80; H04N 21/25875; H04N 63/08; H04N 21/2668; G01C 15/04
USPC ................. 455/456.3; 726/4, 5, 28; 715/758
See application file for complete search history.

(56) References Cited

U.S. PATENT DOCUMENTS

| | | | |
|---|---|---|---|
| 7,428,574 B2 | 9/2008 | Watanabe et al. | |
| 8,127,285 B2 | 2/2012 | Mittal | |
| 8,595,186 B1 * | 11/2013 | Mandyam | G06F 8/38 |
| | | | 707/632 |
| 8,990,235 B2 | 3/2015 | King et al. | |
| 9,253,177 B2 * | 2/2016 | Matsushita | H04N 21/25875 |
| 9,424,019 B2 | 8/2016 | Nightingale et al. | |
| 9,571,525 B2 * | 2/2017 | Nishizawa | G06F 21/604 |

(Continued)

*Primary Examiner* — William D Cumming
(74) *Attorney, Agent, or Firm* — Polsinelli

(57) ABSTRACT

The present technology is an application that detects that a computing device associated with a user account has recently been paired with a new device, or a new service or application has been installed, and presents informational articles to the computing device in response to the detection of the new device, service or application. After the application determines that a new device or service has become present, the application requests an article pertinent to the new device or the new service from a database, displays user interface element representing the article pertinent to the new device, application, or service within the application.

16 Claims, 7 Drawing Sheets

(56) References Cited

U.S. PATENT DOCUMENTS

| | | | |
|---|---|---|---|
| 9,626,500 B2 * | 4/2017 | Ahmad | G06F 21/36 |
| 9,626,655 B2 * | 4/2017 | Haff | G06Q 10/107 |
| 9,628,805 B2 * | 4/2017 | Smarda | G06F 3/04817 |
| 9,645,834 B2 * | 5/2017 | Somani | G06F 8/65 |
| 9,648,371 B2 * | 5/2017 | Waibel | H04N 21/435 |
| 9,792,372 B2 * | 10/2017 | Bai | G06F 17/30867 |
| 9,794,981 B2 * | 10/2017 | Kyou | H04L 67/303 |
| 9,892,064 B2 * | 2/2018 | Holzbecher | G06F 13/105 |
| 9,894,492 B1 * | 2/2018 | Elangovan | H01Q 1/3241 |
| 2007/0281691 A1 | 12/2007 | Svensson | |
| 2012/0190386 A1 * | 7/2012 | Anderson | G01C 15/04 |
| | | | 455/456.3 |
| 2013/0151993 A1 * | 6/2013 | Mayya | H04L 12/1859 |
| | | | 715/758 |
| 2013/0326597 A1 * | 12/2013 | Matsushita | H04N 21/25875 |
| | | | 726/5 |
| 2014/0020012 A1 * | 1/2014 | Matsushita | H04N 21/25875 |
| | | | 725/28 |
| 2015/0082012 A1 * | 3/2015 | Andrews | G06F 9/4416 |
| | | | 713/2 |
| 2015/0381602 A1 * | 12/2015 | Grim | H04L 63/08 |
| | | | 726/4 |
| 2015/0381633 A1 * | 12/2015 | Grim | H04L 63/107 |
| | | | 726/4 |
| 2015/0382195 A1 * | 12/2015 | Grim | H04L 63/08 |
| | | | 726/4 |
| 2016/0012055 A1 * | 1/2016 | Bai | G06F 17/30867 |
| | | | 707/734 |
| 2017/0105701 A1 * | 4/2017 | Pelissier | A61B 8/4254 |
| 2017/0132922 A1 * | 5/2017 | Gupta | G08G 1/0962 |
| 2017/0140143 A1 * | 5/2017 | Ahmad | G06F 21/36 |
| 2017/0206100 A1 * | 7/2017 | Somani | G06F 8/65 |
| 2017/0303336 A1 * | 10/2017 | Kyou | H04L 67/303 |
| 2017/0308370 A1 * | 10/2017 | Sung | G06F 8/65 |
| 2017/0358208 A1 * | 12/2017 | Kazemi | G08G 1/123 |
| 2018/0352426 A1 * | 12/2018 | Kowalczykowski | G06F 9/4411 |

\* cited by examiner

INFORMATIONAL ARTICLES IN RESPONSE TO DETECTION OF DEVICES OR SOFTWARE

RELATED APPLICATIONS

This application claims priority to and the benefit of U.S. Provisional Application No. 62/514,069, filed on Jun. 2, 2017, which is incorporated herein by reference in its entirety.

TECHNICAL FIELD

The present technology pertains to presenting informational content regarding a computing system, and more specifically pertains to presenting informational content regarding a newly paired device or newly installed application or service of the computing system.

BACKGROUND

Owing to the popularity of app stores, modern app stores have an overwhelming amount of content available. These app stores often have top charts, such as lists of the most downloaded apps, or the highest grossing apps, as a means of helping users find the most popular apps. Some app stores can have collections of featured apps. However these features do not adequately solve the problem of helping users to find the best apps in view of the overwhelming amount of content available.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art to provide a better user experience to users of app stores. Specifically, the present technology can proactively surface content informing users of apps that may be of interest to them. The present technology goes beyond lists or even recommendations of apps based on past app downloads, and instead can detect that a computing device associated with a user account has recently been paired with a new device (e.g. smart watch, pencil, Internet of things (IOT) device, or any peripheral device) or a new service has become present (e.g. a new service from an operating system update or other installed software). Such technology not only helps the user find relevant apps in the app store, but also serves to inform the user of potentially useful apps they may not have even known existed. The present technology can also inform the user of functions of devices or the computing system of which the user was unaware.

Figure 1:
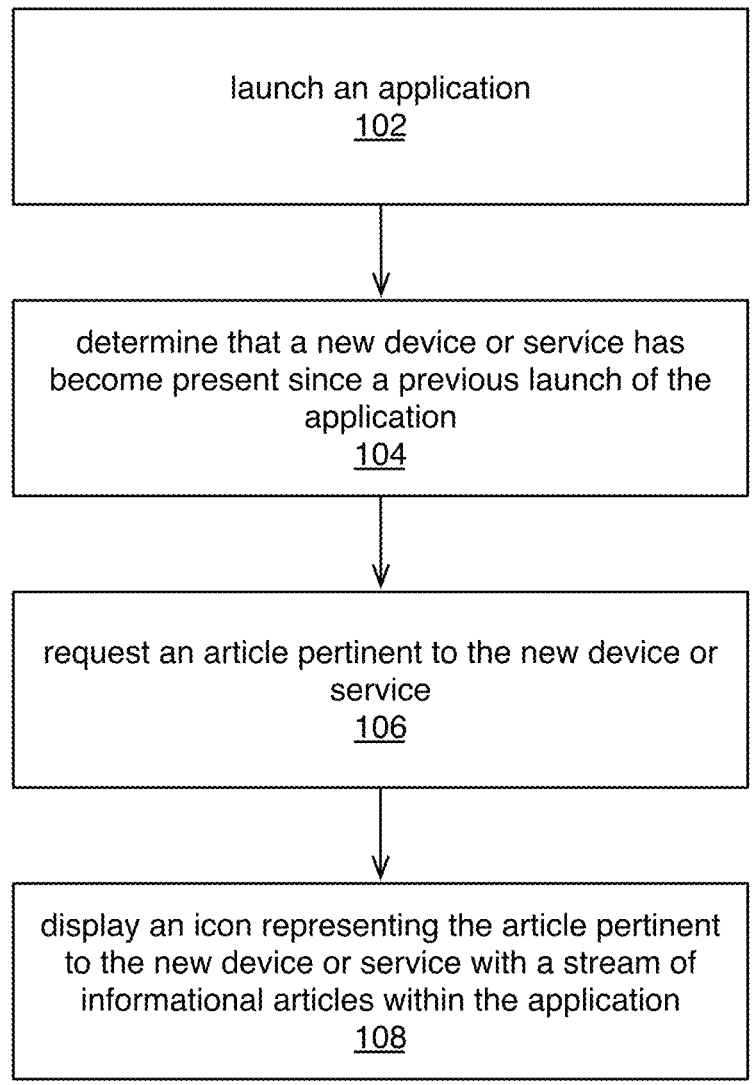
FIG. 1 shows an example method in accordance with some embodiments.

For example, and as illustrated in FIG. 1, a computing device can launch (102) an application. The application can determine (104) that a new device or service or application has become present. In some embodiments, the application can determine (104) that a new device or service has become present when the application detects the new device or service or application for first time.

After the application determines (104) that a new device or service has become present, the application can request (106) an article pertinent to the new device or the new service from a database, e.g. a database stored on a server, and the application can display (108) an icon representing the article pertinent to the new device or service within the application. In some embodiments the application can have a dedicated graphical user interface portion presenting a stream of icons representing informational articles, including the article pertinent to the new device or service.

In some embodiments, the application is useful for accessing the Apps store and for browsing apps and other content relevant to apps, including articles about apps, update notifications, etc. In some embodiments that application for accessing the app store may have different selectable views. Views may be selectable by icons or tabs or the like that are displayed on all of the selectable views thus allowing navigation between views. In one selectable view, the application may display a plurality of App icons that can be viewed, browsed, searched, selected, and purchased. In another different view, the application may display a view containing information regarding information about the new functions or devices of the computing system and Apps relevant to the new functions or devices. In some embodiments this view can contain a stream of icons representing informational articles about the new functions or devices of the computing system and Apps relevant to the new functions or devices may be displayed.

Figure 2:
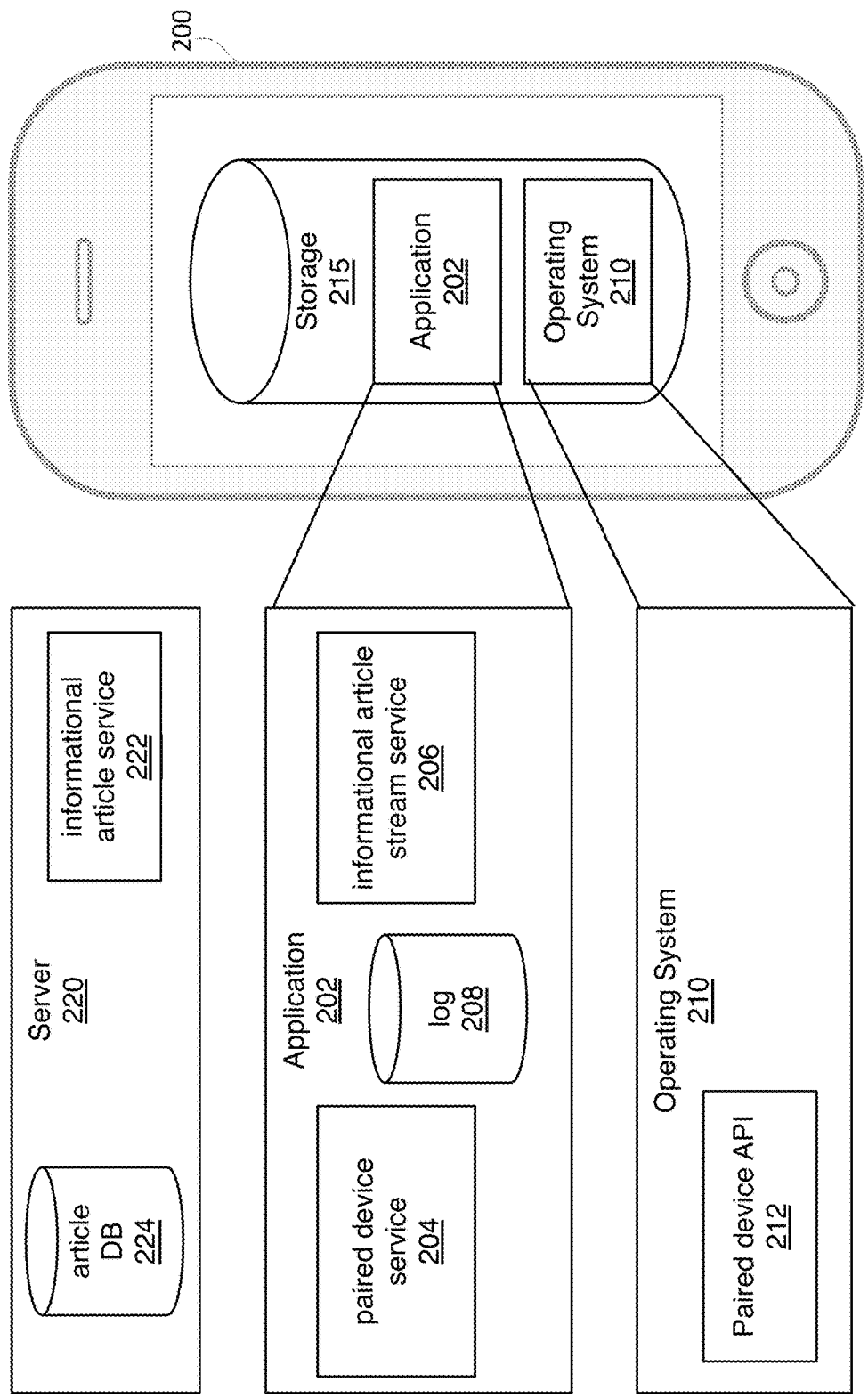
FIG. 2 shows an example system in accordance with some embodiments.

FIG. 2 illustrates an example system for carrying out the present technology. Specifically FIG. 2 illustrates computing device 200 in communication with server 220. Computing device 200 can be any personal computing device including but not limited to a smart phone, a tablet, a laptop, a desktop personal computer, a wearable computing device, an AV device (e.g., TV, speaker, etc.), a printer, a household device, a fitness device, a medical device, a wellness device, etc. As illustrated in FIG. 2, and discussed in more detail with respect to FIG. 5, computing device 200 can have a storage device 215 configured to store code defining software such as operating system 210 and application 202.

Operating system 210 can manage operating functions of computing device 200 through layers of access, such as a privileged layer under control of operating system 210 whereby operating system 210 controls access to and controls operation of physical hardware such as storage device 215 via drivers. Operating system 210 also defines an application layer where applications such as application 202 can reside. Operating system 210 can perform functions in the privileged layer on behalf of applications in the application layer, and can perform services in support of applications in the application layer. In some embodiments operating system 210 can allocate and define sandboxed memory spaces for execution of applications wherein all application functions are contained within the sandbox and the sandboxed applications make requests to the operating system for any resources that exist outside the sandbox.

In some embodiments operating system 210 can cause application, files, and other data to be stored in portions of storage 215. In some embodiments, operating system 210 also defines a storage schema for applications, files, and other data that may need to be accessed by the applications. In some embodiments the storage schema limits access to files or data to the application that stored the files or data. In some embodiments the storage schema can be an open directory structure wherein any application can access the files or data files or data subject to file level access restrictions. For example, and as illustrated in FIG. 2, application 202 can be stored in storage 215. Application 202 code defines at least paired device service 204 and informational articles stream service 206. Application 202 can also define and have access to log 208. In some embodiments log 208 can be stored in the same location in storage 215 as the files including the code that makes up application 202.

As illustrated in FIG. 2 operating system 210 can provide a paired device API 212 from which application 202 can request information regarding previously paired devices.

In some embodiments application 202 can be an application providing an app downloading service from an app store. Application 202 can display a plurality of user interface (UI) elements, e.g., icons, representing apps, which when a corresponding UI element is selected can result in downloading an app from server 220 onto computing device 200. In addition, and as described herein, application 202 is also useful for detecting the presence of a new paired device or new service or new application and providing informational content relevant to the new paired device or the new service or the new application.

Figure 3:
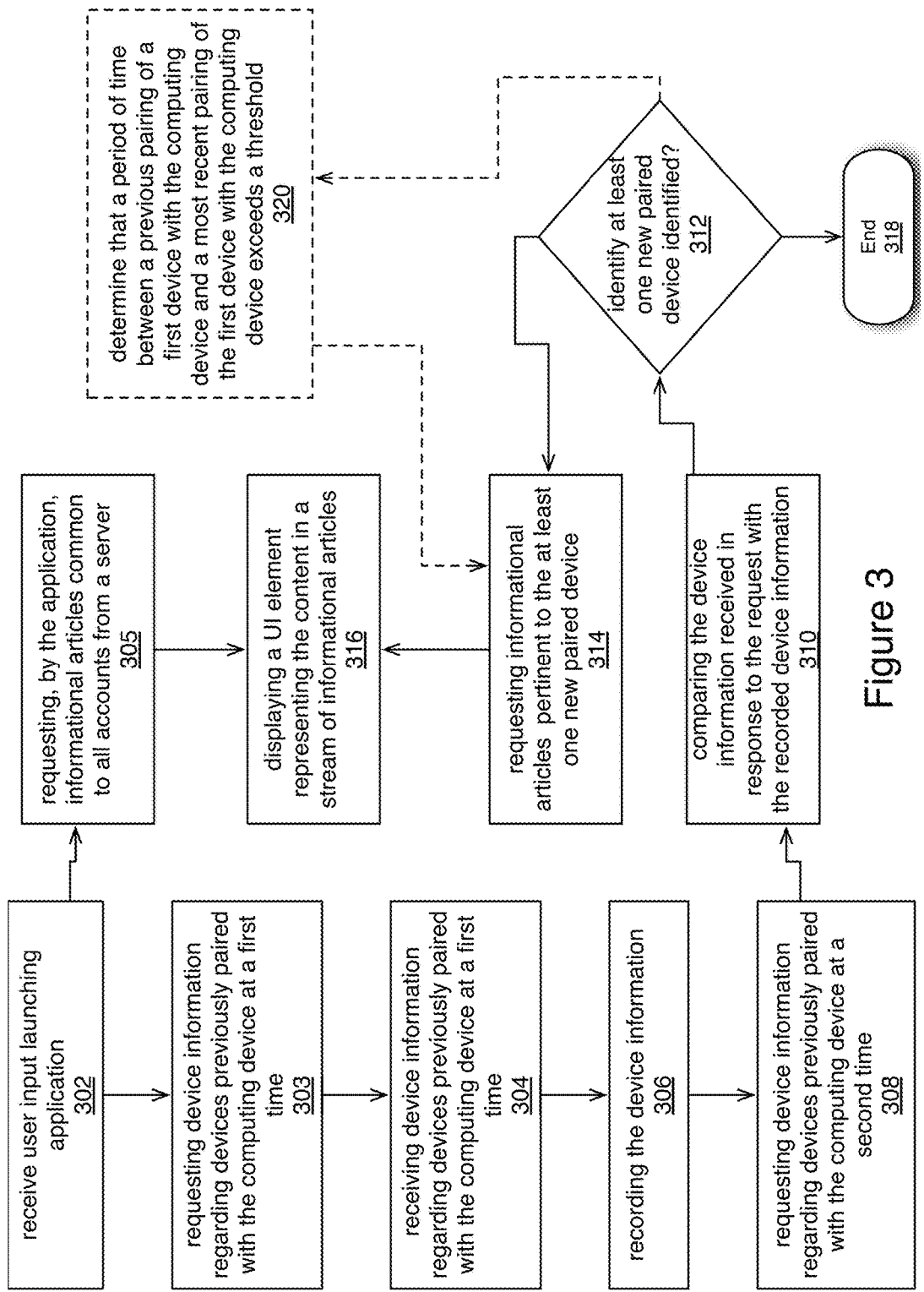
FIG. 3 shows an example method in accordance with some embodiments.

FIG. 3 illustrates an example method embodiment performed by application 202. FIG. 3 will be discussed in context of the system illustrated in FIG. 2. However, it should be recognized that both the system illustrated in FIG. 2 and the method illustrated in FIG. 3 are merely example embodiments and the method illustrated in FIG. 3 should not be limited by the system illustrated in FIG. 2, and vice versa.

As illustrated in FIG. 3, computing device 200 can receive (302) a user input requesting to launch the application. In some embodiments the user input can be a tap or a click on an UI element representing the application. In some embodiments the user input can be a verbal command to launch the application.

Application 202 can be associated with a user account to an application service, such as an app store, provided by server 220. In some embodiments, application 202 can automatically log into the application service using user account credentials while application 202 launches. In some embodiments application 202 can provide a prompt in a user interface on computing device 200 requesting a user to input user account credentials and log into the application service. In some embodiments, it may not be necessary for application 202 to log into the application service at launch. Instead it may suffice for application 202 to be aware of a user ID associated with the user account of the application service so that the application 202 can request content relevant to the user account in accordance with the embodiments addressed below. Login to the user account can occur later, such as when a user associated with the user account attempts to perform an action with the services such as to download an app.

In addition to presenting UI elements representing applications that can be selected and cause the application to be downloaded onto computing device 200, application 202 can also provide a stream of selectable informational article UI elements that represent informational articles pertinent to specific apps, or collections of apps. In some embodiments, the stream is a scrollable stream of UI elements.

Figure 4A:
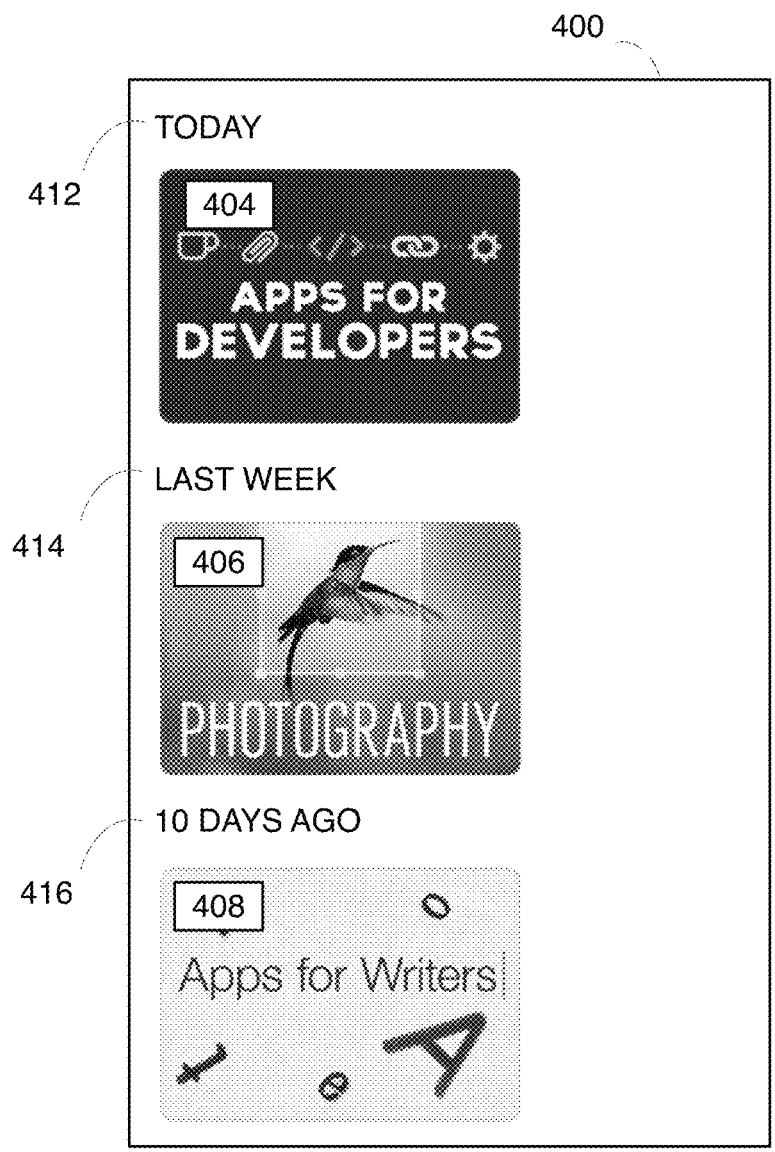
FIG. 4A, 4B, an 4C illustrates an example informational article stream user interface in accordance with some embodiments.

For example FIG. 4A illustrates stream 400 of selectable informational article UI elements 404, 406, 408 representing articles disseminated to all accounts. Each of selectable informational article UI elements 404, 406, 408 represents an informational article that, when selected by a user applying a user input, the application 202 retrieves the respective informational article from article database 224. As illustrated in FIG. 4A selectable informational article UI elements 404, 406, 408 are arranged in a timeline. Selectable informational article UI element 408 appeared in the timeline 10 days ago 416, while selectable informational article UI element 406 appeared in the timeline last week 414, and selectable informational article UI element 404 was posted into the timeline today 412. Once the selectable informational article UI element is posted into the timeline it remains pinned to the period in which it was posted. Often, the period in which the informational article common to all accounts is posted is the first publication of the informational article.

When application 202 is being launched, or after application 202 has been launched, informational article stream service 206 can request (305) any new informational articles common to all accounts to be placed in the stream of selectable informational article UI elements from informal article service 222 and can display (316) any new selectable informational article UI elements representing an informational article at the top of the informational article stream as instructed by informational article service 222. In other words, the informational articles common to all accounts is user account agnostic and is presented by application 202 on all user devices.

Also while application 202 is being launched, or after application 202 has been launched, paired device service 204 of application 202 can request (303) device information regarding devices previously paired with the computing device from paired device API 212. In some embodiments application 202 can also query operating system 210 to detect an operating system version and/or a list of installed applications.

As described herein the request 303 will be referred to as taking place at a first time. The reference to the first time is relative to references to a second time such as with respect to step 308 addressed below. Any references to the first time or the second time should be considered as reference to relative time periods rather than absolute time periods. For example a first time is merely prior to a second time, and does not necessarily refer to a initial time application 202 was opened. Likewise a second time is a time following the first time, and does not necessarily refer to immediately subsequent opening of application 202 following the initial time application 202 was opened.

In response to the request 303, paired device API 212 of operating system 210 can respond to the request 303 with a list of all devices that have been previously paired with computing device 200. Application 202 can receive (304) the list of devices that have been previously paired with computing device 200 and can record (306) the device information in log 208. In some embodiments, the device information can include timestamps indicating previous dates in which the devices have been previously paired with computing device 200 along with the list of devices previously paired. In some embodiments the device information can be limited to only devices that have been previously paired with computing device 200 within a particular period of time, e.g. past six months, past three months, past one month, etc.

If application 202 detects an operating system version and/or a list of installed applications, this information can also be stored with device information in log 208.

Subsequently, at a second time, application 202 can again be launched in the same manner as application 202 was launched at the first time. During or after the launch of the application at the second time, paired device service 204 can again request (308) device information regarding devices previously paired with the computing device from paired device API 212. Upon receiving a response to request 308, paired device service 204 can compare (310) the device information received in response to request 308 with the device information previously recorded at the first time in log 208. From the comparison, paired device service 204 can identify (312) a device in the list of previously paired devices received in response to request 308 that does not exist in the list of previously paired devices stored in log 208.

The identification (312) of at least one new device that has become paired or at least one new application or service that has been installed can involve determining if a new device is reported by paired device API 212 or an application or service is reported by operating system 210 that was not recorded at the first time in log 208. When paired device service 204 determines that the response at the second time from paired device API 212 or operating system 210 includes a device or application or service that was not recorded at the first time in log 208, paired device service 204 can identify (312) that paired device is as a new paired device or the application or service as newly installed since the first time, and informational article stream service 206 can request (314) content pertinent to the new device or service or application from informational article service 222.

In response to request 314 informational article service 222 can send, and information article stream service 206 can receive, data identifying any informational articles relevant to the new device, application, or service to be placed in the stream of selectable informational article UI elements from informal article service 222 and can display (316) any selectable informational article UI elements representing the informational article at the top of the informational article stream as instructed by informational article service 222.

In contrast to the informational articles requested in request 305 that are common to all accounts, the informational articles requested in request 314 are likely historical articles. In many instances, the informational articles requested in request 314 have been posted in article database 224 for some period of time, perhaps a week(s), or a month(s), and likely have been widely published before, at least to other users, while the informational articles common to all accounts requested in request 305 are likely new articles that have been posted in article database 224 for a period of days, i.e. they are recent articles. Often the informational articles requested in request 305 have not been published before the current period.

In some embodiments, such as illustrated in FIG. 3, the informational articles for display in the stream of informational articles can come to application 202 as the result of two or more requests for informational articles—request 305 and request 314. However, in some embodiments, it can be possible to make both requests simultaneously.

Figure 4B:
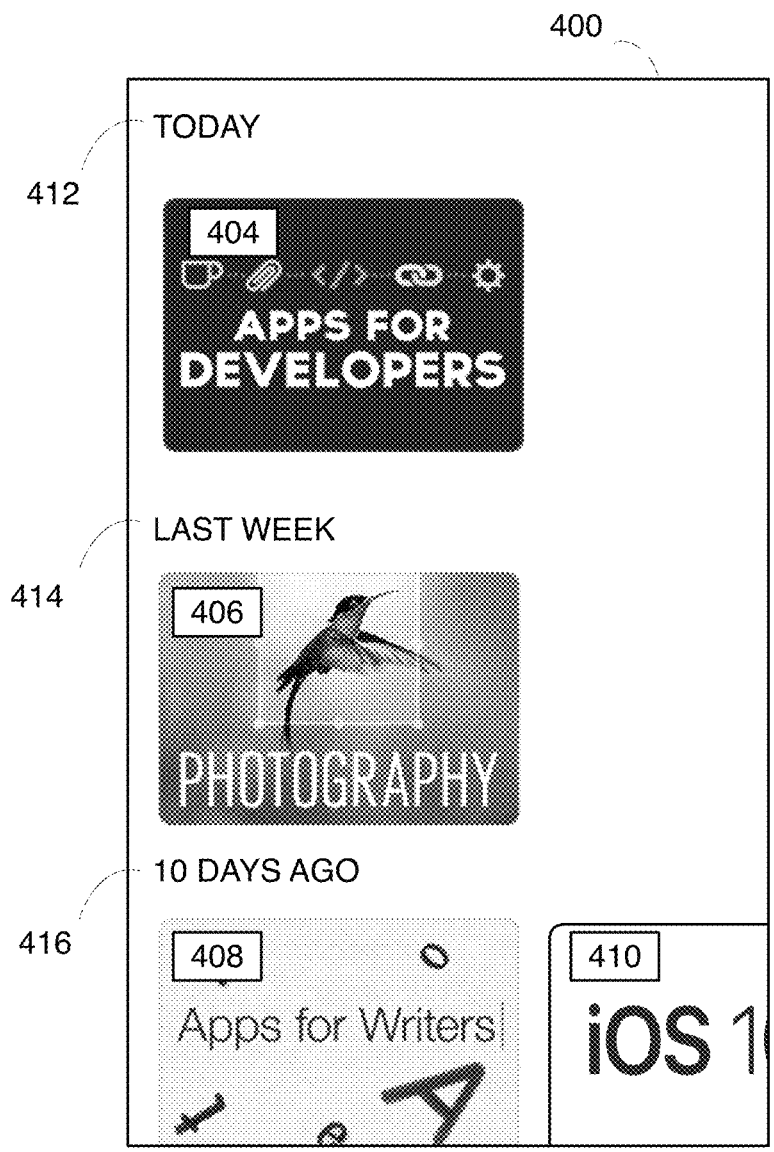

In some embodiments, information in response to either request 305 or request 314 may need to be added to the existing informational article stream. This could occur in embodiments wherein application 202 stores the most recent version of the informational article stream, until informational article stream service receives additional content to be added to the stream. For example, FIG. 4B illustrates an example informational article stream that has resulted from informational article stream service 206 making request 305 for new articles to add to information article stream 400. Informational article stream service 206 has received data describing the article represented by UI element 404 and application 202 has added and displayed (316) UI element 404 under the "today" heading 412.

Figure 4C:
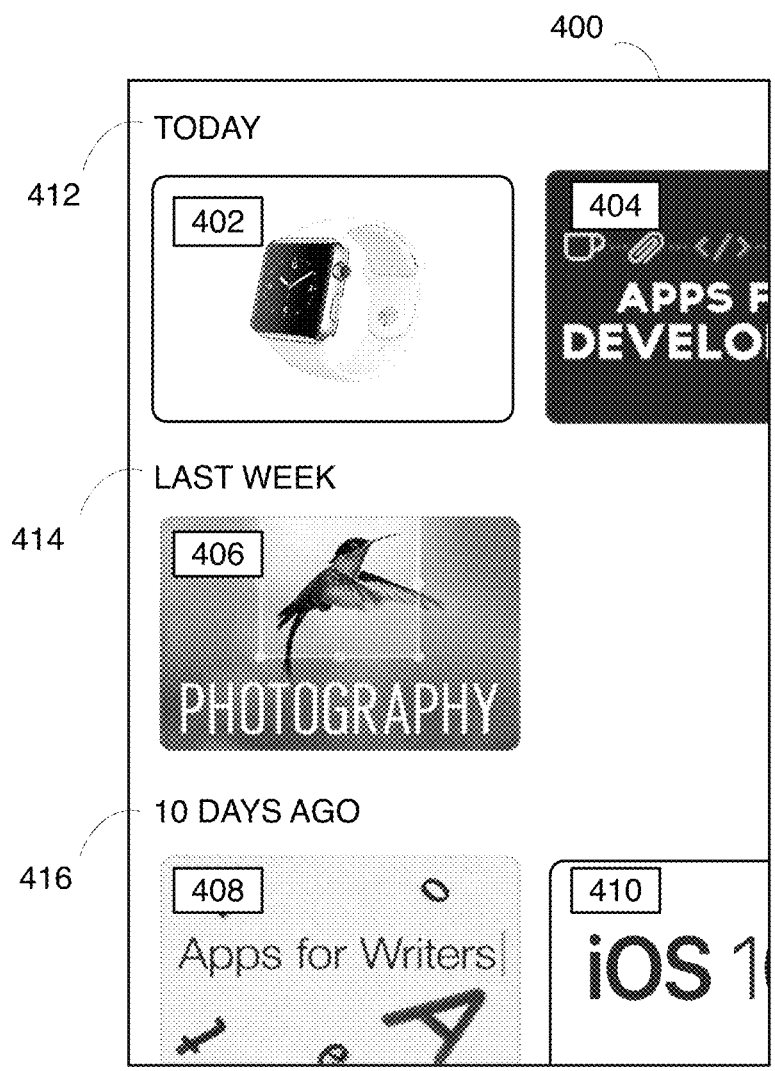

FIG. 4C illustrates the informational article stream 400 after informational article stream service 206 has identified (312) that a new watch (e.g., APPLE WATCH) was paired with computing device 200, and has requested (314) and received information regarding an article on the watch. Application 202 can then add UI element 402 to informational article stream 400 under the heading "today" 412. UI element 402 representing the article on the newly paired watch device is placed under the "today" heading 412 even though the article has been widely published in past periods to other users because the UI elements are pinned to the day they enter the informational article stream for a specific computing device, i.e., computing device 200. For example FIG. 4C also illustrates UI element 410 representing an article on an update to the iOS10 operating system posted 10 days ago 416 to informational article stream 400. While UI element 410 representing the article on the update to the iOS10 operating system would have come into stream 400 as a result of request 314 for informational articles pertinent to the identified (312) update to the operating system, and is not an informational article distributed to all accounts, UI element 410 also remains pinned to the timeline in informational article stream 400 and moves along with other UI element 408 posted at the same time.

Returning to FIG. 3, in some embodiments, when paired device service 204 does not identify (312) a newly paired device or newly installed application or service, the method ends (318) and as there is no additional content to request or display.

While it may provide a better user experience to only display an informational article relevant to a newly paired device, or newly installed application or service once, immediately after paired device service 204 first identifies (312) the newly paired device or installed application or service, in some embodiments, informational articles can be repeat posts, or they can be suppressed.

In some embodiments, an informational article can be added to informational article stream an additional time if certain criteria is met. For example, if it has been a long time since a device was paired, it might be useful to the user to see an informational article relevant to the device in the informational article stream. In such embodiments, paired device service 204 can determine (320) a period of time between a previous pairing of a first device with the computing device and a most recent pairing of the first device with the computing device, and find the period of time exceeds a threshold. In such embodiments, paired device service 204 can receive a last paired date for devices previously paired with the computing device at the first time, and then at the second time can determine that the period of time between a previous pairing of a first device with the computing device and a most recent pairing of the first device with the computing device exceeds a threshold amount of time. Based on exceeding the threshold period of time, the informational article service 206 can request content pertinent to the previously paired device.

In contrast, in some embodiments, paired device service 204 can determine that a new device has been paired with computing device 200, and can determine that no informational articles should be retrieved. For example, the detected device might be discontinued, or not a supported device.

In some embodiments, information from paired device service 204 regarding previously paired devices can be used in combination with a recommendation engine to recommend informational articles or recommend apps specific to a user account.

In some embodiments, information from paired device service 204 regarding previously paired devices can be combined with information stored in association with a user account to recommend informational articles or recommend apps specific to a user account.

In recommendations embodiments such as those introduced above, server 220 can receive information from application 202 that identifies a user account, applications installed on device 200, and previously paired devices. Server 220 can utilize this information in combination with information regarding the user account that it has received from other computing devices associated with user account, to recommend informational articles or applications to user account. In such embodiments, information regarding a particular paired device, can allow server 220 to recommend apps for that paired device. In some embodiments the potential apps that can be recommended can be further narrowed or expanded in view of app engagement data for the user account. Server 220 may be able to identify types of apps that the user account tends to interact with frequently, or may be able to identify a preference for free verses paid applications.

Figure 5:
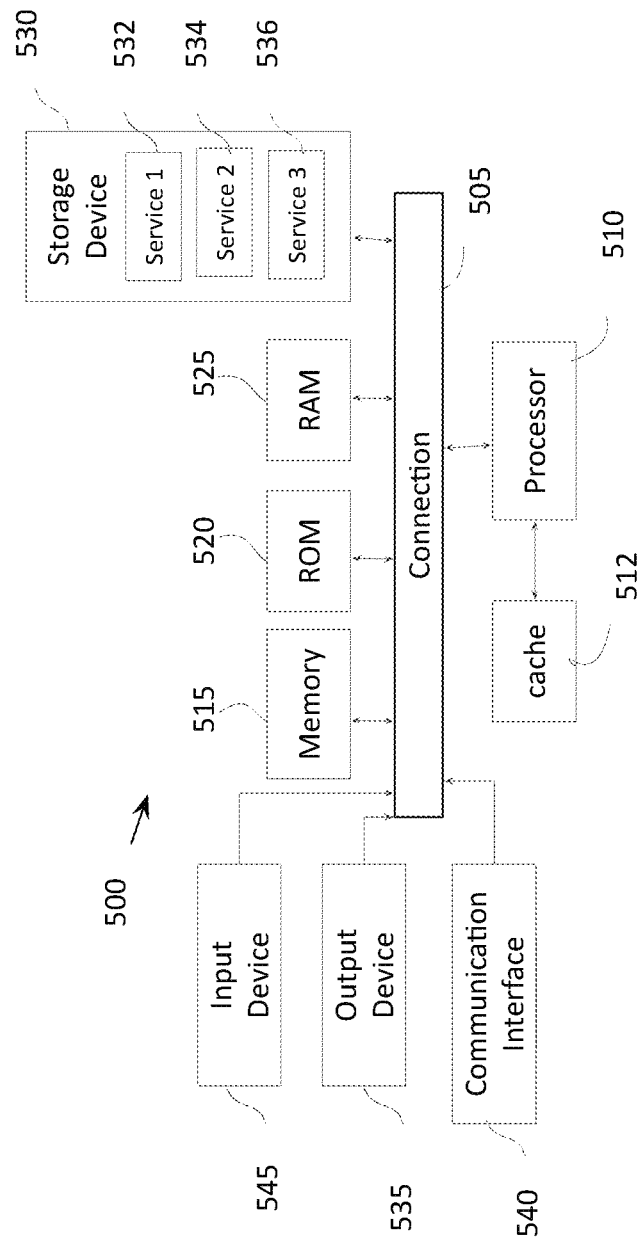
FIG. 5 shows an example system for implementing certain aspects of the present technology.

FIG. 5 shows an example of computing system 500, which can be for example computing device 200, in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read only memory (ROM) and random access memory (RAM) to processor 510. Computing system 500 can include a cache of high-speed memory connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   at a first time:
     launching an application by a computing device associated with a user account, the application providing an app downloading service including displaying a plurality of apps for selection and downloading;
     requesting, by the application, device information regarding devices previously paired with the computing device;
     receiving, by the application, device information regarding devices previously paired with the computing device in response to the request made at the launch of the application;
     recording, by the application, the device information received in response to the request made at the launch of the application;
   at a second time:
     launching the application by the computing device associated with the user account;
     requesting, by the application, device information regarding devices previously paired with the computing device at launch of the application;
     receiving, by the application, device information regarding devices previously paired with the computing device in response to the request made at the launch of the application;
   comparing the device information received in response to the request made at the second time with the device information recorded at the computing device in response to the request made at first time;
   based on the comparing, identifying at least one new device for which device information was received in response to the request made at the second time that was not in the device information received in response to the request made at the first time;
   requesting, by the application, content pertinent to the at least one new device; and
   displaying a user interface element on a display of the computing device that represents the content received in response to the request in the application;
   wherein the displaying a user interface element includes:
     displaying a streaming view of a plurality of selectable informational article user interface elements that, when selected, displays content corresponding to the selected informational article user interface element, and
     adding a selectable user interface element that represents the content pertinent to the at least one new device to the streaming view, based on identifying the at least one new device.

2. The method of claim 1 comprising:
   requesting, by the application, a stream of selectable informational article user interface elements from a server, wherein the requesting of the stream of selectable informational article user interface elements is a separate request from the requesting the content pertinent to the at least one new device, and
   wherein adding the user interface element that represents the content into the stream of selectable informational article user interface elements is performed by the application.

3. The method of claim 2 comprising:
   wherein the stream of selectable informational article user interface elements include new articles organized in the stream based on their posting date, and wherein the user interface element that represents the content is organized into the stream based on its posting date in the stream, wherein the content is a historical article.

4. The method of claim 1, comprising:
   determining that a new operating system version has been installed on the computing device at the second time since the first time; and
   displaying a user interface element that represents the content pertinent to the new operating system version when it is determined that the new operating system version has been installed.

5. The method of claim 1 comprising:
   determining at the first time, a last paired date for devices previously paired with the computing device at the launch of the application;
   determining that a period of time between a previous pairing of a first device with the computing device and a most recent pairing of the first device with the computing device exceeds a threshold; and when the period of time exceeds the threshold, requesting content pertinent to the first device.

6. A non-transitory computer readable medium comprising instructions stored thereon, the instructions effective to cause an application including an informational article stream service, and a new paired device or service to cause a computing device to:

determine by a new paired device service that a new device or a new service has become present;

request an article pertinent to the new device or the new service from a server by the informational article stream service; and display, by the informational article stream service, an icon representing article pertinent to the new device or service within a stream of icons representing informational articles within the application.

7. The non-transitory computer readable medium of claim 6, wherein the instructions to determine that the new device has become present includes instructions effective to cause a computing device to:

detect, by the new paired device service, that new device has been paired with the computing device;

check, by the new paired device service, a log of previously paired devices for a presence of the new device; and determine, by the new paired device service, that the new device is not in the log of previously paired devices.

8. The non-transitory computer readable medium of claim 6, wherein the instructions to determine that the new service has become present includes instructions effective to cause a computing device to:

detect an updated operating system version number of an updated operating system, wherein the updated operating system provides the new service.

9. The non-transitory computer readable medium of claim 7, wherein the log of previously paired devices is maintained according to instructions effective to cause a computing device to:

request, by the new paired device service, a list of previously paired devices from an operating system application programming interface; and record, by the new paired device service, the list of previously paired devices in the log of previously paired devices, wherein the log is stored in an application specific storage space.

10. The non-transitory computer readable medium of claim 6, wherein the instructions effective to cause a computing device to:

request, by the informational article stream service, the informational articles from a server, wherein the request for the informational articles is a separate request from the request for the article pertinent to the new device or the new service, and wherein introducing the icon representing content into the stream of the icons representing the informational articles is performed by the informational article stream service.

11. The non-transitory computer readable medium of claim 10, wherein the icons representing the informational articles in the stream is organized based on a recent posting date, and the content received in response to the request is a historical article having a posting date older then the recent posting date.

12. A computing system comprising:

an operating system including a paired device application programming interface; and an application on the computing system, the application including an informational article stream service, and a new paired device service, wherein the new paired device service is configured to determine that a new device has been paired to the computing system using the paired device application programming interface, and the informational article stream service can request an article pertinent to the new device.

13. The computing system of claim 12, wherein the informational article stream service is configured to present an icon representing a received article pertinent to the new device or service within a stream of informational article articles within the application.

14. The computing system of claim 12 comprising:

a log communicatively coupled to the new paired device service, wherein the log is configured to store a list of previously paired devices a first time.

15. The computing system of claim 14 wherein the new paired device service is configured to determine that the new device have been paired to the computing system by receiving at a second time a list of previously paired devices from the paired device application programming interface, and to compare the list of previously paired devices at the second time with the previously paired devices stored in the log at the first time, and to identify a device in the list of previously paired devices at second time that does not exist in the list of previously paired devices stored in the log at the first time.

16. The computing system of claim 14, comprising:

a storage device under control of the operating system, wherein the storage device includes an application portion reserved for the application, and wherein the log is stored in the application portion.

* * * * *